(12) United States Patent
Tokunaga et al.

(10) Patent No.: US 7,880,339 B2
(45) Date of Patent: Feb. 1, 2011

(54) ISOLATION CIRCUITRY AND METHOD FOR HIDING A POWER CONSUMPTION CHARACTERISTIC OF AN ASSOCIATED PROCESSING CIRCUIT

(75) Inventors: Carlos Alfonso Tokunaga, Hillsboro, OR (US); David Theodore Blaauw, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 174 days.

(21) Appl. No.: 12/320,747

(22) Filed: Feb. 3, 2009

(65) Prior Publication Data

US 2010/0194205 A1    Aug. 5, 2010

(51) Int. Cl.
*H01H 85/46* (2006.01)
(52) U.S. Cl. ...................................... 307/115
(58) Field of Classification Search ................. 307/115; 726/36; 713/300, 320
See application file for complete search history.

(56) References Cited

U.S. PATENT DOCUMENTS

| | | | | |
|---|---|---|---|---|
| 4,528,499 | A | * | 7/1985 | Traub .......................... 324/610 |
| 4,932,053 | A | | 6/1990 | Fruhauf et al. |
| 5,795,292 | A | * | 8/1998 | Lewis et al. .................. 600/323 |
| 5,873,816 | A | * | 2/1999 | Kagawa et al. .............. 600/134 |
| 7,199,576 | B2 | * | 4/2007 | Gallein ..................... 324/158.1 |
| 7,342,389 | B1 | | 3/2008 | Wu et al. |
| 2007/0176670 | A1 | | 8/2007 | Corsonello et al. |

FOREIGN PATENT DOCUMENTS

WO   WO 00/54230   9/2000

OTHER PUBLICATIONS

UK Search Report dated Apr. 22, 2010 for GB 0922235.7.

* cited by examiner

*Primary Examiner*—Albert W Paladini
(74) *Attorney, Agent, or Firm*—Nixon & Vanderhye P.C.

(57) ABSTRACT

An isolation circuitry and method are provided for coupling between a power supply and processing circuitry in order to provide power to the processing circuitry whilst hiding a power consumption characteristic of that processing circuitry. The isolation circuitry comprises a plurality of sub-circuits, with each sub-circuit comprising a capacitor, a first switch configured to provide a first connection between the capacitor and the power supply, a second switch configured to provide a second connection between the capacitor and the processing circuitry, and a third switch configured to provide a third connection across the capacitor to partially discharge the capacitor. Control circuitry controls the plurality of sub-circuits, such that within each sub-circuit the first switch, second switch and third switch are placed in an active state in a repeating sequence. Each of the plurality of sub-circuits further comprises a comparator configured to place the third switch in an open state when a predetermined non-zero voltage difference across the capacitor is reached during the active state of the third switch. By such an approach, it is ensured that the voltage across the comparator at the end of the discharge operation is always the same irrespective of the voltage present at the start of the discharge operation. As a result, the power consumption characteristic of the processing circuitry is entirely hidden by the isolation circuitry. Further, the isolation circuitry of the present invention provides a particular power efficient mechanism for hiding the power consumption characteristic of the processing circuitry.

17 Claims, 10 Drawing Sheets

| SC MODULE | SEQUENCE | $t_0$ | $t_1$ | $t_2$ |
|---|---|---|---|---|
| 1 | S1 | CHARGE | | |
| 1 | S2 | | LOGIC SUPPLY | |
| 1 | S3 | | | SHUNT |
| 2 | S1 | | CHARGE | |
| 2 | S2 | | | LOGIC SUPPLY |
| 2 | S3 | SHUNT | | |
| 3 | S1 | | | CHARGE |
| 3 | S2 | LOGIC SUPPLY | | |
| 3 | S3 | | SHUNT | |

Legend: ▨ CHARGE, ⋯ LOGIC SUPPLY, ⋰ SHUNT

FIG. 7A

| SC MODULE | SEQUENCE | | | |
|---|---|---|---|---|
| 1 | S1 | CHARGE | | |
| 1 | S2 | | LOGIC SUPPLY | |
| 1 | S3 | | | SHUNT |
| 2 | S1 | | CHARGE | |
| 2 | S2 | | | LOGIC SUPPLY |
| 2 | S3 | SHUNT | | |
| 3 | S1 | | | CHARGE |
| 3 | S2 | LOGIC SUPPLY | | |
| 3 | S3 | | SHUNT | |

FIG. 7B

| SC MODULE | SEQUENCE | | |
|---|---|---|---|
| 1 | S1 | ▦ | |
| | S2/S3 | | ▨ |
| 2 | S1 | | ▦ |
| | S2/S3 | ▨ | |

FIG. 8

ISOLATION CIRCUITRY AND METHOD FOR HIDING A POWER CONSUMPTION CHARACTERISTIC OF AN ASSOCIATED PROCESSING CIRCUIT

BACKGROUND OF THE INVENTION

1. Field of the Invention

The present invention relates to an isolation circuitry and method for coupling between a power supply and processing circuitry in order to provide power to the processing circuitry whilst hiding a power consumption characteristic of that processing circuitry.

2. Description of the Prior Art

It is known to provide processing circuits which perform data processing operations using secret data which needs to be protected against unauthorised access. For example, it is known to provide processing circuits that perform encryption and decryption using particular encryption and decryption algorithms that make use of secret data such as a secret key. As a particular example, the algorithms specified by the Advanced Encryption Standard (AES) make use of a secret key to perform encryption and decryption operations. Unencrypted input data (referred to as plaintext) may be encrypted using the secret key to produce encrypted data (referred to as ciphertext), or alternatively the encrypted ciphertext may be input and then decrypted using the secret key in order to produce the corresponding unencrypted plaintext.

Often the processing circuitry used to perform such encryption and decryption operations is provided as part of an integrated circuit, one particular example of such an integrated circuit being a smart card.

For such integrated circuits, various techniques have been developed to seek to guard against unlawful attempts to access secure data within the integrated circuit via non-invasive attacks. One known technique for seeking to access such secret data is differential power analysis (DPA). Such DPA techniques seek to extract secret data such as the earlier-mentioned secret key from observation of a power consumption characteristic of the processing circuitry for various different input data. One common power consumption characteristic that may be observed is the current signature, which can be detected by coupling a circuit to the power input terminals of the integrated circuit, with the attacker then observing how the current signature changes for various different input data.

Since it is generally known what algorithms are being executed by the integrated circuit, it is possible to model the operation of the integrated circuit and thereby produce simulated current signatures for various different guesses of the secret key. Attempts can then be made to correlate the simulated current signatures for various guesses of the secret key with the actual current signatures observed in the circuit, in order to thereby seek to determine the secret key. In particular, if the correlation coefficient for one particular guessed secret key is higher than the correlation coefficients obtained for any other guesses of the secret key, then this indicates that that particular guessed secret key is the actual secret key.

US 2007/0176670, the entire contents of which are hereby incorporated by reference, discusses a number of techniques proposed at both the software level and the hardware level to seek to make differential power analysis techniques ineffective. That patent then describes a charge-pump technique for a smart card that includes a capacitor that is connected cyclically to the power source to charge the capacitor, to the processing device to power the processing device, and then to ground to discharge the capacitor. The charge-pump system can include three such capacitors so that while one of them is charging, another is powering the processing device, and the third is discharging. The described charge-pump system seeks to block attempts to discover a secret key in the processing device by de-correlating power consumption from the internal operations of the processing device.

In accordance with the charge-pump technique described in US 2007/0176670, it will be appreciated that when the capacitor is coupled to the processing device to power that processing device, the extent to which the capacitor is discharged during that powering operation will depend on the activities of the processing device, and accordingly the starting voltage level at the time the capacitor is then connected to ground will vary. The discharging of the capacitor to ground will then follow an exponential decay, and accordingly will never actually reach ground potential. At the time the discharging process is ended, the final voltage level reached will hence depend on the initial voltage at the time the discharging operation was initiated, and accordingly at the time the capacitor is reconnected to the power source to recharge the capacitor, the starting voltage will be different depending on what the initial voltage was at the start of the discharge process.

Further, at the time the capacitor is connected to the power source, that voltage level can be observed by someone performing a non-invasive attack using DPA, and accordingly any slight differences in that final voltage reached at the end of the discharge period can be observed. As a result, there is still a possibility that through DPA techniques, the secret key may be extracted, provided a sufficient number of data samples are input to the smart card.

In US 2007/0176670, the time periods used to charge the capacitor, to power the processing device using the capacitor, and to ground the capacitor, are all equal, and hence this limits the amount of time that can be spent discharging the capacitor. Accordingly, using the technique described in US 2007/0176670, if one were to increase the length of the discharge period to seek to reduce the variation in final voltage reached at the end of the discharge period, it would be necessary to increase both the charging period and the powering period, which would be undesirable. In particular, if a larger powering period is specified, it will be necessary to provide a larger capacitor, which will increase the area overhead. Further, a larger capacitor will take longer to discharge, thereby requiring a larger discharge transistor to discharge the capacitor, further increasing the area overhead. If a larger discharge transistor is not used, then this will render the increased length of discharge time less effective, due to the larger capacitor being discharged.

Alternatively, in order to support more than one discharge phase, it would be necessary to provide additional capacitors and associated switching elements. For example, if six capacitors and associating switching elements were provided, then each capacitor could pass through one charge phase, one powering phase and four discharge phases. However, such an approach would significantly increase the cost of the charge-pump circuit, both in terms of size and power consumption (due to the additional components provided).

Furthermore, it should be noted that even if the discharge period is extended by either of the above techniques, there will still be differences in the final voltage reached at the end of the discharge phase dependent on the initial voltage across the capacitor at the time the discharge phase was initiated, and accordingly such an approach does not remove the earlier-mentioned problem of providing an attacker the possibility of still employing DPA techniques to seek to ascertain the secret key.

Accordingly, it would be desirable to provide an improved technique for seeking to hide a power consumption characteristic of the processing circuitry so as to make DPA techniques ineffective.

SUMMARY OF THE INVENTION

Viewed from a first aspect, the present invention provides isolation circuitry for coupling between a power supply and processing circuitry in order to provide power to the processing circuitry whilst hiding a power consumption characteristic of that processing circuitry, the isolation circuitry comprising: a plurality of sub-circuits, each sub-circuit comprising: a capacitor; a first switch configured to provide a first connection between said capacitor and said power supply; a second switch configured to provide a second connection between said capacitor and an output to said processing circuitry; a third switch configured to provide a third connection across said capacitor to partially discharge said capacitor; and control circuitry configured to control said plurality of sub-circuits, such that within each sub-circuit said first switch, said second switch and said third switch are placed in an active state in a repeating sequence; each of said plurality of sub-circuits further comprising: a comparator configured to place said third switch in an open state when a predetermined non-zero voltage difference across said capacitor is reached during the active state of the third switch.

In accordance with the present invention, each of the plurality of sub-circuits includes a comparator in association with the third switch. Rather than allowing the third switch to discharge the capacitor for the entirety of the active state of the third switch, the comparator instead stops the discharge process when the voltage difference across the capacitor reaches a predetermined non-zero voltage, by placing the third switch in an open state once that predetermined non-zero voltage has been reached. As a result, the length of time for which the capacitor is discharged during the active state of the third switch will vary dependent on the initial voltage across the capacitor at the time the active state of the third switch is started. However, the final voltage across the capacitor at the end of the active state of the third switch will be identical in all instances, namely the predetermined non-zero voltage difference.

Accordingly, for each repeating sequence, the power consumption characteristic that can be observed by tapping into the connection between the isolation circuitry and the power supply will be identical, irrespective of the power consumed by the processing circuitry. Accordingly, this prevents any secret data used by the processing circuitry from being ascertained through DPA techniques.

Furthermore, when compared with the technique described in US 2007/0176670, it will be appreciated that the isolation circuitry of the present invention consumes significantly less power than is consumed by the charge-pump subsystem described in that patent. In particular, in each charge, use and discharge cycle of the charge-pump in US 2007/0176670, the voltage across the capacitor is brought up to the supply voltage, and then discharged to a voltage near ground. However, during the use phase where the capacitor is used to power the processing device, the voltage will drop by a relatively small amount. For example, merely for the purposes of illustration, if the capacitor is charged to a supply voltage level of approximately 1.1 Volts, it may be expected that during the use phase the voltage across the capacitor will drop to approximately 1 Volt, the exact voltage drop being dependent on the operation performed by the processing device. Hence, during the subsequent discharge phase, a significant voltage drop across the capacitor takes place, with the subsequent charging process then consuming a significant amount of power for no useful purpose.

However, in accordance with the present invention, the predetermined non-zero voltage difference can be chosen to be at as high a voltage level as possible, taking account of the lowest expected voltage at the end of the use phase, and allowing sufficient time for the comparator to operate. In practice it has been found that the voltage drop that then takes place during the discharge phase can be kept relatively small, thereby significantly reducing power consumption when it is subsequently needed to charge the capacitor back up to the supply voltage level.

As a particular example, if the supply voltage is 1.1 Volts, and that voltage drops down to approximately 1 Volt during the use phase, then it may be sufficient to set the predetermined non-zero voltage difference at 0.95 volts. As a result, it can be seen that the power overhead associated with the discharge process is only 50%, when compared with the power consumed to drive the processing circuitry. In contrast, considering a similar supply voltage when using the technique of US 2007/0176670, it will be seen that the equivalent power overhead is approximately 1000%, assuming the final voltage reached after the discharge phase is near to 0 volts.

Hence, it will be appreciated that the isolation circuitry of the present invention is more effective at protecting the processing circuitry from DPA techniques, whilst also consuming significantly less power than the known prior art techniques.

In one embodiment, the isolation circuitry further comprises discharge tuning circuitry placed in series with said third switch across said capacitor, the discharge tuning circuitry being responsive to a control signal from the control circuitry to enable the rate of discharge of the capacitor during the active state of the third switch to be varied. Such an approach provides significant flexibility, since it enables the same isolation circuitry to be used with a variety of different processing circuits, which may for example operate at different speeds. Dependent on the operating speed of the processing circuit, the discharge tuning circuit enables the rate of discharge of the capacitor to be sped up or slowed down as required, without needing to change the duration of the active state of the third switch.

The comparator can take a variety of forms. However, in one embodiment, the comparator comprises an op-amp receiving at a first input an indication of the voltage difference across said capacitor and at a second input an indication of said predetermined non-zero voltage.

The indication of the predetermined non-zero voltage used by the comparator can be provided to the comparator in a variety of ways. For example, this indication may be hardwired as an input to the comparator. However, in one embodiment, the isolation circuitry further comprises a reference voltage generation element programmable to provide an indication of said predetermined non-zero voltage. This again provides significant flexibility, by allowing the same isolation circuitry to be used with a variety of different processing circuits, and enabling the predetermined non-zero voltage to be programmed as appropriate having regard to the processing circuit with which the isolation circuitry is used.

The control circuitry can control the repeating sequence for each sub-circuit in a variety of ways. In one embodiment, for each sub-circuit the control circuitry controls the repeating sequence to ensure that only one of said first connection, said second connection and said third connection is provided at a time within that sub-circuit.

Further, in one embodiment the control circuit controls said plurality of sub-circuits such that the repeating sequences of the sub-circuits are in a phased relationship to one another. In one embodiment, the phased relationship ensures that at most one first connection, one second connection and one third connection are provided by the isolation circuitry at any point in time.

However, it is not essential for the phased relationship to be arranged in that way, and in an alternative embodiment the phased relationship ensures that the active state of at least one of the first, second and third switches overlaps between the plurality of sub-circuits.

In one particular embodiment, the active state of at least the second switch overlaps between the plurality of sub-circuits, such that for at least some periods of time the processing circuitry receives its power from at least two of said plurality of sub-circuits. The benefit of such an approach is that the power consumption characteristics of the processing circuitry during the time the processing circuitry is powered by the isolation circuitry is spread over multiple capacitors, thereby further obfuscating that power consumption characteristic. However, such overlapping of the active states need not be restricted to the active state of the second switches, and instead the charge operations and the discharging operations can also be overlapped if desired.

In one embodiment, the plurality of sub-circuits comprises at least three sub-circuits. However, whilst providing at least three sub-circuits improves flexibility with regard to how the control circuit controls the various charge, use and discharge phases of operation, it is not essential to provide at least three sub-circuits. For example, in one embodiment, the active states of said first, second and third switches are not all of the same duration, and said plurality of sub-circuits comprise at least two sub-circuits. In one particular embodiment, whilst one sub-circuit has the second switch in the active state, a second sub-circuit passes through both the active state of the third switch and the active state of the first switch (i.e. the cumulative period of time for the active state of the first and third switches is the same as the period of time for the active state of the second switch). By such an approach, the benefits of the present invention can be realised but without the need to provide three or more sub-circuits, thereby reducing the size and cost of the isolation circuitry.

Viewed from a second aspect, the present invention provides an integrated circuit comprising processing circuitry, and isolation circuitry in accordance with the first aspect of the present invention. By constructing the integrated circuit in such a manner, then any attempt to perform DPA analysis by coupling a circuit across the power inputs to the integrated circuit will fail, due to the isolation circuitry preventing the power consumption characteristics of the processing circuitry from being observed.

In one embodiment the processing circuitry performs encryption and decryption operations using at least one secret key. Through use of the integrated circuit of embodiments of the present invention, the isolation circuitry prevents the secret key from being deduced using DPA techniques.

Whilst in one embodiment, the entirety of the processing circuitry within the integrated circuit is coupled to the power supply via the isolation circuitry, this will not be a requirement in all embodiments. For example, in one embodiment the integrated circuit may comprise additional processing circuitry which is coupled directly to the power supply. This may, for example, be appropriate where that additional processing circuitry does not perform operations on any secret data, and accordingly there is no need to prevent observation of the power consumption characteristics of that additional processing circuitry.

The integrated circuit may take a variety of forms, but in one embodiment the integrated circuit is a smart card.

Viewed from a third aspect, the present invention provides isolation circuitry for coupling between power supply means and processing means for providing power to the processing means whilst hiding a power consumption characteristic of that processing means, the isolation circuitry comprising: a plurality of sub-circuit means, each sub-circuit means comprising: a capacitor means; a first switch means for providing a first connection between said capacitor means and said power supply means; a second switch means for providing a second connection between said capacitor means and an output to said processing means; a third switch means for providing a third connection across said capacitor means to partially discharge said capacitor means; and control means for controlling said plurality of sub-circuit means, such that within each sub-circuit means said first switch means, said second switch means and said third switch means are placed in an active state in a repeating sequence; each of said plurality of sub-circuit means further comprising: comparator means for placing said third switch means in an open state when a predetermined non-zero voltage difference across said capacitor means is reached during the active state of the third switch means.

Viewed from a fourth aspect, the present invention provides a method of employing a plurality of sub-circuits to interconnect a power supply and processing circuitry in order to provide power to the processing circuitry whilst hiding a power consumption characteristic of that processing circuitry, the method comprising performing in each of the plurality of sub-circuits a repeating sequence comprising the steps of: connecting the power supply to a capacitor to charge said capacitor; disconnecting the power supply from the capacitor; connecting said capacitor to an output to said processing circuitry; disconnecting said capacitor from said output; shorting said capacitor to partially discharge said capacitor; and stopping the shorting of said capacitor when a predetermined non-zero voltage difference across said capacitor is reached.

BRIEF DESCRIPTION OF THE DRAWINGS

The present invention will be described further, by way of example only, with reference to embodiments thereof as illustrated in the accompanying drawings, in which:

FIGS. 7A and 7B illustrate two switching sequences that may be generated by the control circuitry of FIG. 2 in order to drive each of the three sub-circuits illustrated in FIG. 2 in accordance with embodiments of the present invention;

FIG. 8 illustrates a switching sequence that may be generated by the control circuitry when utilising only two sub-circuits within the isolation circuitry in accordance with an alternative embodiment of the present invention;

DESCRIPTION OF EMBODIMENTS

Figure 1:
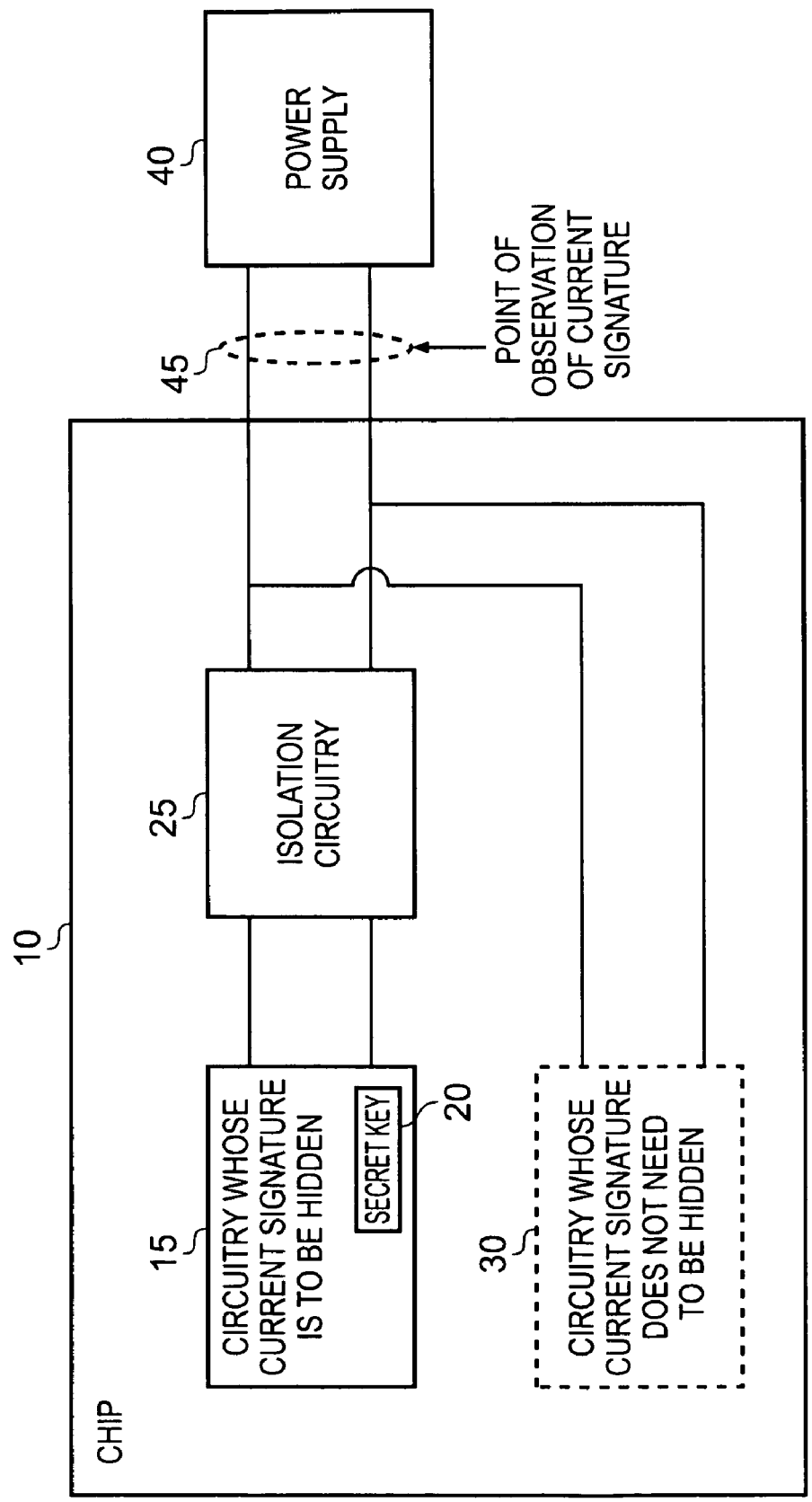
FIG. 1 is a block diagram of an integrated circuit in accordance with one embodiment of the present invention.

FIG. 1 is block diagram illustrating an integrated circuit in accordance with an embodiment of the present invention. In this example, the integrated circuit takes the form of a chip 10, which in one particular embodiment may be a smart card. The chip 10 includes circuitry 15 whose current signature is to be hidden, such that it can not be observed at an observation point 45 between a chip 10 and the power supply 40. In particular, the circuitry 15 performs data processing operations using some secret data which an attacker may seek to determine using DPA techniques, these techniques typically involving the placing of analysis circuitry including resistive elements between the power supply lines at the location 45 in order to obtain current signature information dependent on the power drawn by the chip 10 from the power supply.

The analysis circuitry uses a model of the circuitry 15, that model having been derived from available information about the operations being performed by the circuitry (for example the basic encryption and decryption operations performed by encryption/decryption standards are generally well known), and any information known about the basic structure of the circuitry (for example knowledge that the results of a first operation would be latched prior to being forwarded to a second operation, etc). Using that model, then for each item of input data provided to the chip 10, modelled current signatures can be generated from the model for each of a plurality of guessed secret data (often the secret data is broken down into 8 bit chunks to make this process manageable), and then the analysis circuitry can seek to correlate the actual current signature observed at the observation point 45 with those various modelled current signatures. If this process is repeated for many different input data items, then it has been found to be possible to identify the secret data, as this will be the guessed secret data that emerges as having the highest correlation coefficient with the actual current signatures observed at the observation point 45.

In the example of FIG. 1, the secret data takes the form of a secret key 20 used during encryption and decryption operations performed by the circuitry 15. In one particular example, the circuitry 15 performs encryption and decryption operations in accordance with the Advanced Encryption Standard (AES), where during encoding operations the secret key is used to encode plaintext in order to produce output ciphertext, and during a decoding operation the secret key is used to obtain plaintext from encoded ciphertext.

In order to prevent DPA techniques being effective, it is necessary to decouple the power consumption characteristic which can be observed at the observation point 45 from the actual power consumption characteristic produced by the operation of the circuitry 15. In particular, the power consumption characteristic as observed at the point 45 should ideally be data independent. In accordance with embodiments of the present invention, this is achieved through the use of the isolation circuitry 25, whose operation will be described in more detail below. It should be noted that the isolation circuitry 25 may be used in association with all of the circuitry within the chip 10, or alternatively may be used only with a subset of circuitry within the chip 10, i.e. that circuitry that is making use of secret data such as the secret key 20. Accordingly, as shown by the dotted box 30 in FIG. 1, there may in some embodiments be circuitry whose current signature does not need to be hidden, and accordingly which can be coupled directly to the power supply 40, rather than via the isolation circuitry 25.

Figure 2:
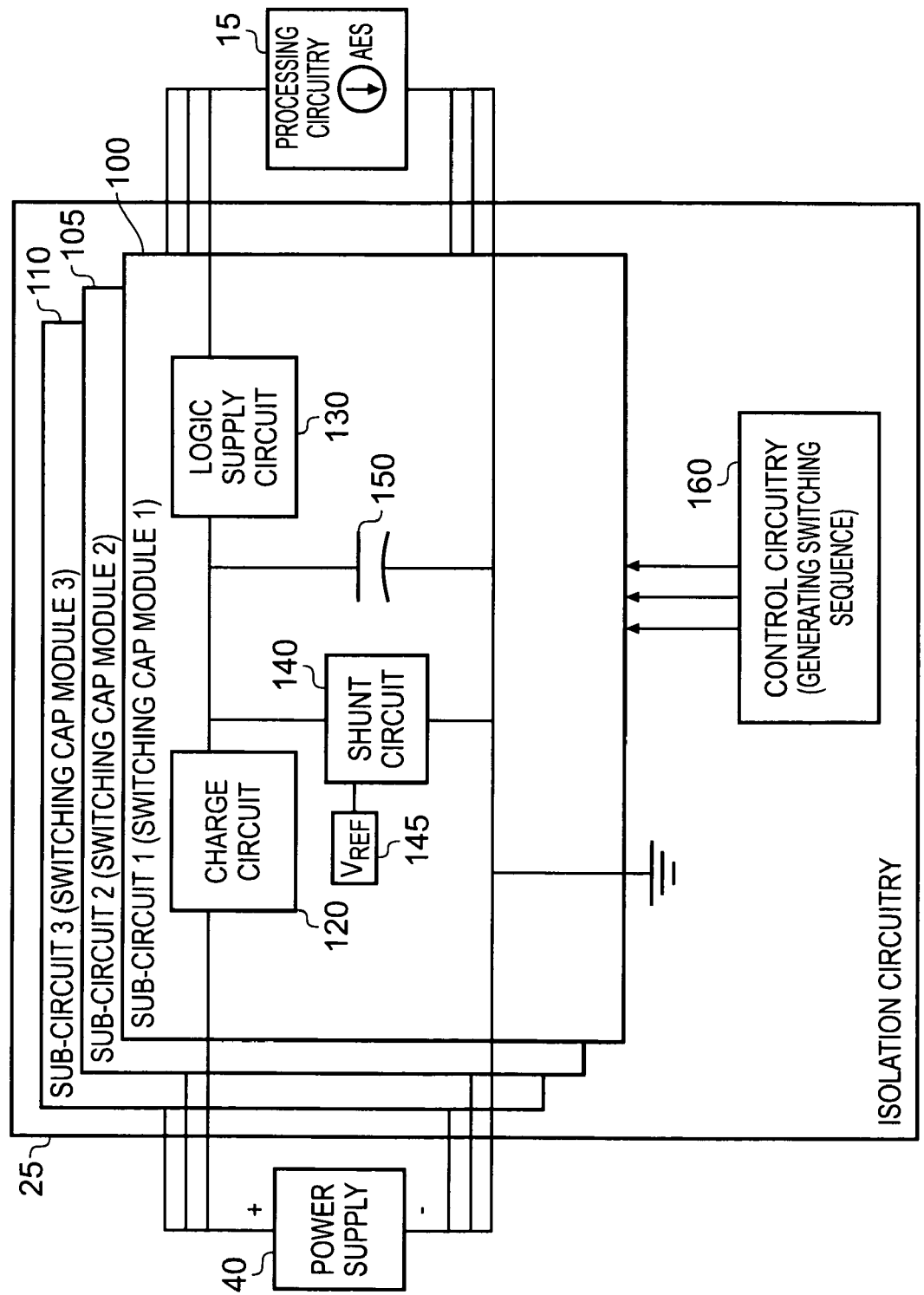
FIG. 2 is a block diagram illustrating in more detail the structure of the isolation circuitry of FIG. 1 in accordance with one embodiment of the present invention.

FIG. 2 is a block diagram illustrating in more detail the structure of the isolation circuitry 25 in accordance with one embodiment. In this example, the power supply 40 is shown to the left hand side of the figure, and the processing circuitry 15 is shown to the right hand side. Three sub-circuits 100, 105, 110 (also referred to herein as switching cap modules) are provided, and each is constructed in an identical manner. In particular, each switching cap module has a capacitor 150 connected across the power supply lines, and that capacitor 150 is used to provide an operating voltage to the processing circuitry 15. Further, a charge circuit 120, logic supply circuit 130 and shunt circuit 140 are provided. Each of these three circuits is placed in to an active state one after the other, in a repeating sequence.

Accordingly, the charge circuit 120 is first placed in an active state, with the logic supply circuit 130 and shunt circuit 140 being in an inactive state at that time. The charge circuit 120 incorporates a switch that is closed at the beginning of the active state and opened at the end of the active state. Accordingly, during the active state of the charge circuit, the capacitor 150 is charged from the power supply 40. At the end of the active state of the charge circuit, the capacitor is disconnected from the power supply 40 by the switch within the charge circuit being placed in an open state.

Then, the logic supply circuit 130 enters an active state, and includes a switch which is closed at the beginning of the active state of the logic supply circuit, and opened at the end of the active state of the logic supply circuit. As a result, during the active state of the logic supply circuit, the processing circuitry 15 is powered by the capacitor 150, and during this process the voltage across the capacitor 150 will drop slightly, with the amount of the drop being dependent on the actual operations performed by the processing circuitry 15 during that period.

Following the active state of the logic supply circuit 130, the shunt circuit 140 enters an active state. The shunt circuit 140 also includes a switch which is closed at the beginning of the active state of the shunt circuit 140, thereby causing the capacitor 150 to begin to discharge. However, in addition, the shunt circuit 140 includes a comparator which compares the voltage across the capacitor with a reference voltage 145. Whilst the voltage across the capacitor is greater than the reference voltage 145, the switch remains closed and the capacitor continues to discharge. However, once the voltage difference across the capacitor 150 reaches the reference voltage 145, then the comparator issues an output signal which causes the switch within the shunt circuit to enter an open state, thereby stopping further discharge of the capacitor.

Hence, whilst the switch of the shunt circuit 140 is closed at the beginning of the active state of the shunt circuit, that switch will be opened again before the end of the active period, with the exact time at which the switch is opened being dependent on the initial voltage existing across the capacitor 150 at the time the active state of the shunt circuit was initiated. As a result, at the end of the active state of the shunt circuit, the voltage difference across the capacitor 150 will be identical (namely the reference voltage 145), irrespective of the voltage across the capacitor 150 at the time the active state of the shunt circuit was initiated.

Accordingly, when the process then returns to the active state of the charge circuit 120, the voltage that will at that point be present at the observation point 45 between the power supply 40 and the chip 10 will always be the same, and accordingly any current signature obtained at the observation point will be completely identical for every repeating sequence of the charge circuit, logic supply circuit and shunt circuit. This thereby prevents any useful information being obtained from DPA techniques, and in particular protects the secret key used by the processing circuitry 15 from being deduced from such DPA techniques.

Control circuitry 160 is provided for issuing switching sequence control signals to the various sub-circuits 100, 105, 110. In one embodiment, the active state of each of the charge circuit 120, logic supply circuit 130 and shunt circuit 140 has the same duration, and the control circuitry 160 issues control signals to the three sub-circuits in a phased relationship, so that at any point in time the charge circuit in one of the sub-circuits is active, the logic supply circuit 130 in another of the sub-circuits is active and the shunt circuit in the third of the sub-circuits is active. Hence, at any point in time, in such an embodiment, one capacitor is being charged, one capacitor is being used to provide a supply voltage to the processing circuitry 15, and one capacitor is being discharged.

However, it is not essential for the control circuitry 160 to operate the various sub-circuits in the above manner, and as will be discussed in more detail later, the phased relationship may allow some overlap between the active states of the various sub-circuits, and indeed the duration of the active states of the charge circuit, logic supply circuit and shunt circuit need not be identical.

A reference voltage generator 145 is provided to generate the reference voltage to be input to the shunt circuit 140. In one embodiment, this reference voltage generator is programmable so that the exact value of the reference voltage produced may be varied, for example taking into account the processing circuitry with which the isolation circuitry is to be used. For example, if a first processing circuit consumes on average more power than a second processing circuit, then if the isolation circuit is used with the first processing circuit the voltage present across the capacitor at the start of the shunt phase will on average be lower than would be the case if the isolation circuit were used with the second processing circuit. By providing a programmable reference voltage generator, then a lower reference voltage can be set if the isolation circuit is used with the first processing circuit, and a higher reference voltage can be set if the isolation circuit is used with the second processing circuit.

Figure 3:
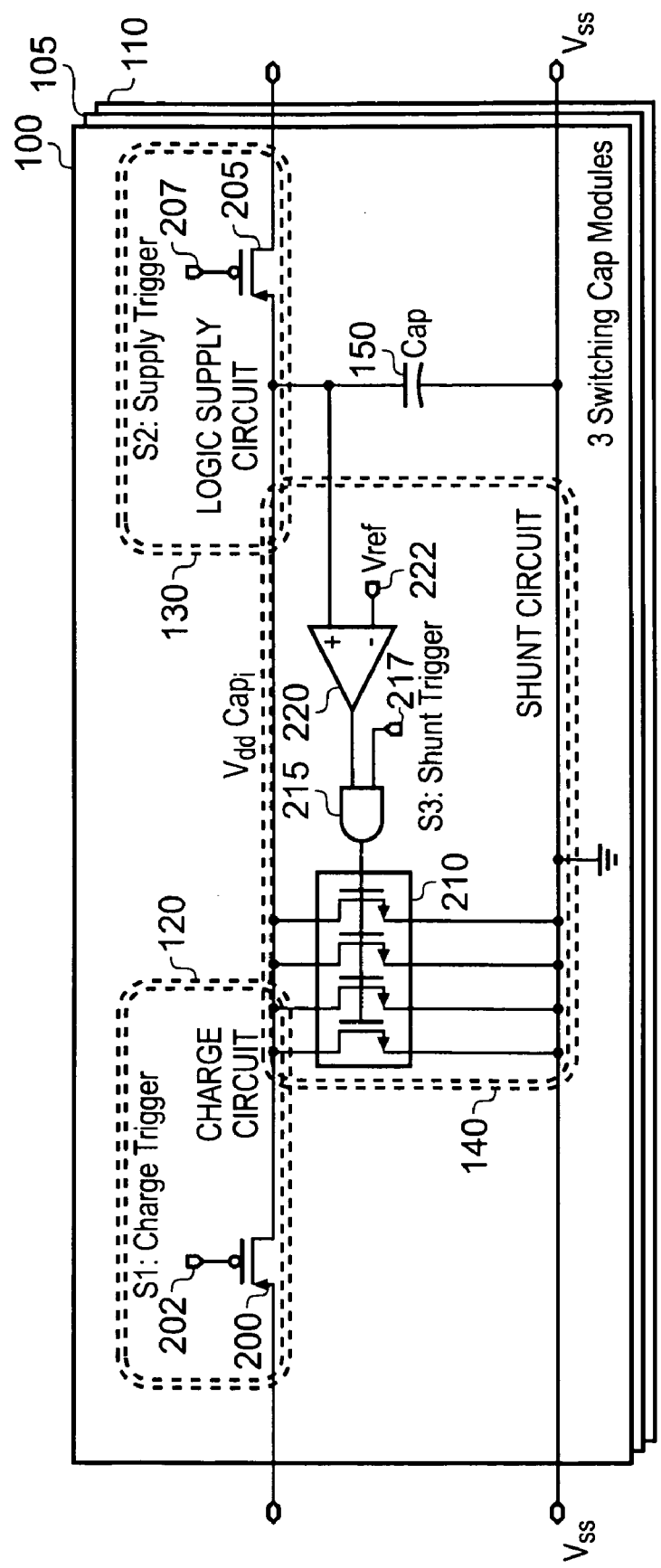
FIG. 3 illustrates in more detail the structure of each sub-circuit in FIG. 2 in accordance with a first embodiment of the present invention.

FIG. 3 illustrates in more detail the components provided within the charge circuit 120, logic supply circuit 130 and shunt circuit 140 in accordance with one embodiment of the present invention. In this example, the switch within the charge circuit 120 is provided by a PMOS transistor 200 which receives at its gate input 202 a charge trigger signal S1.

When the charge trigger signal goes to a low voltage level, the transistor 200 turns on to provide the closed state of the switch, and conversely when the charge trigger signal goes high, the transistor turns off to provide the open state of the switch.

As can be seen from FIG. 3, the logic supply circuit 130 also includes a PMOS transistor 205 which operates in an identical manner, but is driven as its gate input 207 by a logic supply trigger signal S2.

Within the shunt circuit 140, a switch 210 is provided, which in the example embodiment is provided by a plurality of NMOS transistors in parallel. The gates of these NMOS transistors receive their input from an AND gate 215, which in turn receives its first input from a comparator 220, and its second input 217 from a shunt trigger signal S3. The capacitor 220 receives at one input the voltage across the capacitor 150, and at a second input 222 the reference voltage generated by the reference voltage generator 145.

The shunt trigger signal S3 is set to a logic 1 (high) level for the duration of the active state of the shunt circuit 140. Whilst the voltage of the capacitor 150 is higher than the reference voltage, the comparator 220 also outputs a logic 1 signal, causing the AND gate 215 to output a logic 1 value, thereby turning on the NMOS transistors to form the closed state of the switch 210. Accordingly the capacitor 150 discharges during this time.

However, as soon as the voltage of the capacitor 150 reaches the reference voltage, the output from the comparator 220 goes to a logic zero level, causing the AND gate 215 to output a logic zero signal, thereby turning off the NMOS transistors to cause the switch 210 to enter its open state. No further discharging of the capacitor 150 will then occur for the remainder of the active state of the shunt circuit 140.

Figure 4:
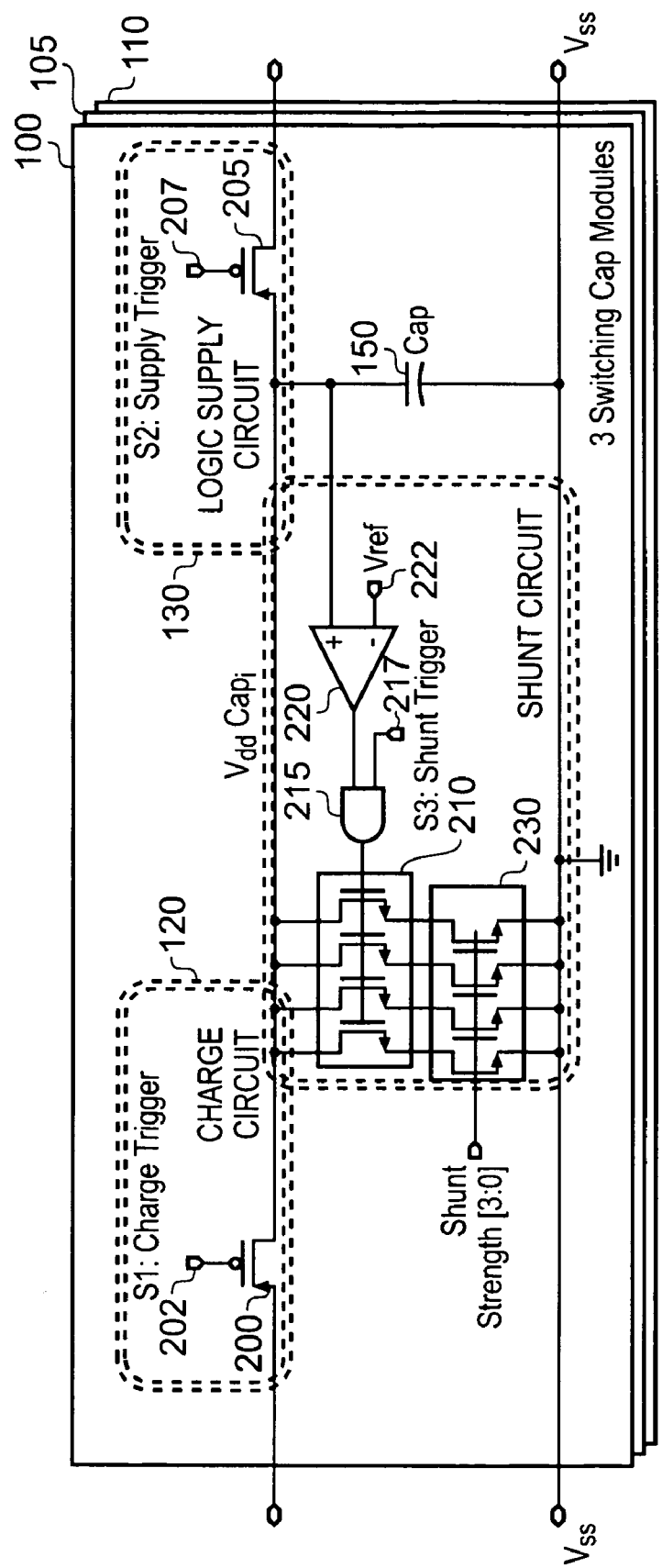
FIG. 4 illustrates in more detail the structure of each sub-circuit in FIG. 2 in accordance with a second embodiment of the present invention.

FIG. 4 illustrates an alternative embodiment of switching cap module. As can be seen from a comparison of FIGS. 3 and 4, the only difference is the provision of discharge tuning circuitry 230 provided in series with the switch 210 across the capacitor 150. As with the switch 210, the discharge tuning circuit 230 is formed of a plurality of NMOS transistors. In this example, four NMOS transistors are provided, and the gate of each NMOS transistor is driven by one of the bits of a four bit shunt strength signal generated by the control circuitry. Accordingly, if that four bit shunt strength signal is 1111, all of the transistors in the discharge tuning circuit 230 will be turned on, and accordingly all of the NMOS transistors in the switch 210 are used to discharge the capacitor, thereby allowing for a strong discharge of the capacitor. However, by appropriate selection of shunt strength signals, one or more of the transistors in the discharge tuning circuit can be turned off, thereby reducing the number of transistors in the switch 210 that perform any active discharging operation during the active state of the shunt circuit.

Through the provision of such discharge tuning circuitry, the same isolation circuitry can be used with a variety of different processing circuits, operating at different speeds. In particular, the speed of the discharge operation can be increased or decreased by appropriate selection of the shunt strength signal, taking into account the speed of operation of the processing circuitry.

Figure 5:
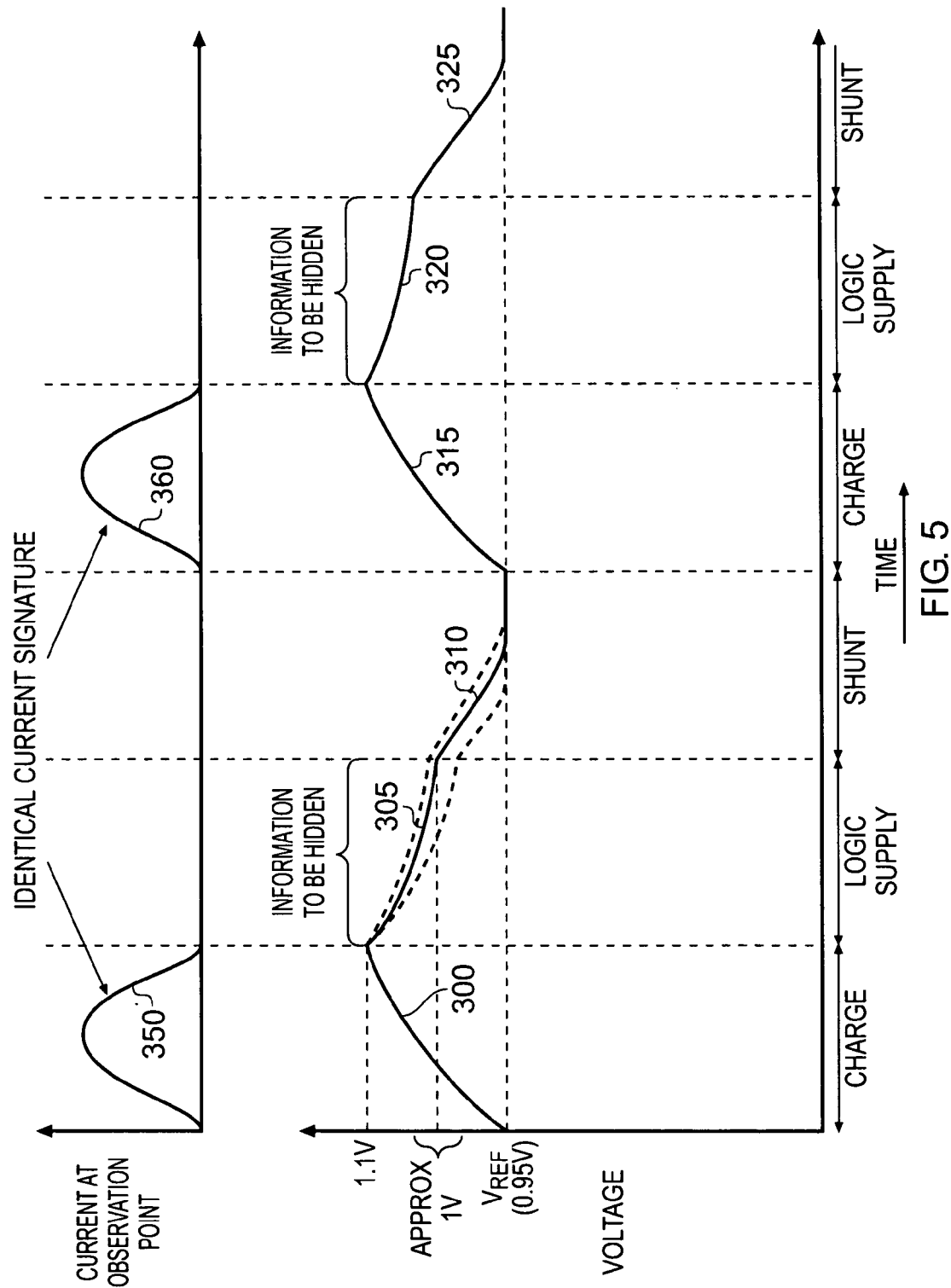
FIG. 5 illustrates how a voltage across the capacitor of each sub-circuit varies during the distinct charge, supply and shunt phases, and further illustrates the corresponding current signature that would be observed at interface between the integrated circuit and the power supply, in accordance with one embodiment of the present invention.

FIG. 5 is a diagram illustrating how the voltage across the capacitor varies during the repeating sequence of active states of the charge circuit, logic supply circuit and shunt circuit. As shown by the line 300, during the active state of the charge circuit, the voltage across the capacitor increases up to a supply voltage level, in this example the supply voltage level being 1.1 Volts. Then, during the active state of the logic supply circuit 130, the capacitor is used to power the processing circuitry. As a result, the voltage will slowly decrease due to the power consumed by the processing circuitry performing its operations, with the voltage thereby following the line 305. It should be noted however that the exact amount by which the voltage decreases will depend on the actual processing operations being performed by the processing circuitry, and in particular the data values being manipulated. Hence, even if the processing circuitry performs the same encryption or decryption operations during each active state of the logic supply circuit, the actual power consumed will depend on the values being processed, and this can lead to the variation in voltage drop across the capacitor as shown by the dotted lines either side of line 305. Accordingly, the final voltage across capacitor 150 at the end of the active state of the logic supply circuit 130 will vary somewhat, but in the example illustrated in FIG. 5 is expected to be approximately 1 Volt.

During the active state of the shunt circuit 140, the voltage across the capacitor 150 is discharged until it reaches the reference voltage level, in the example of FIG. 5 the reference voltage level being 0.95 Volts. As can clearly be seen in FIG. 5, irrespective of the voltage at the start of the shunt cycle, the final voltage reached will always be 0.95 Volts. Accordingly, during the next charge phase, the path 315 will be identical to the path 300, causing the voltage across the capacitor to be charged from the reference voltage level up to the supply voltage level. Thereafter, the voltage follows the path 320, 325 during the subsequent logic supply circuit and shunt circuit active states. As can be seen, whilst the path 315 will be identical to the path 300, the paths 320 and 325 may vary slightly from the paths 305 and 310, due to the differences in power consumed by the processing circuitry.

In the top part of FIG. 5, an indication of the current signature that can be observed at the observation point 45 is provided. It is only whilst the charge circuit 120 is active that any current signature can be obtained at all (since at other times the charge circuit isolates the observation point from the processing circuitry), and it should be noted that the current signatures 350 and 360 are completely identical due to the identical nature of the charging paths 300, 315. Accordingly, the power consumption information of the processing circuitry is entirely hidden, and accordingly no useful current signature information can be obtained from employing DPA techniques. In particular, it will be appreciated that the current signature obtained at the observation point is entirely data independent, and hence prevents effective differential power analysis.

Figure 6A:
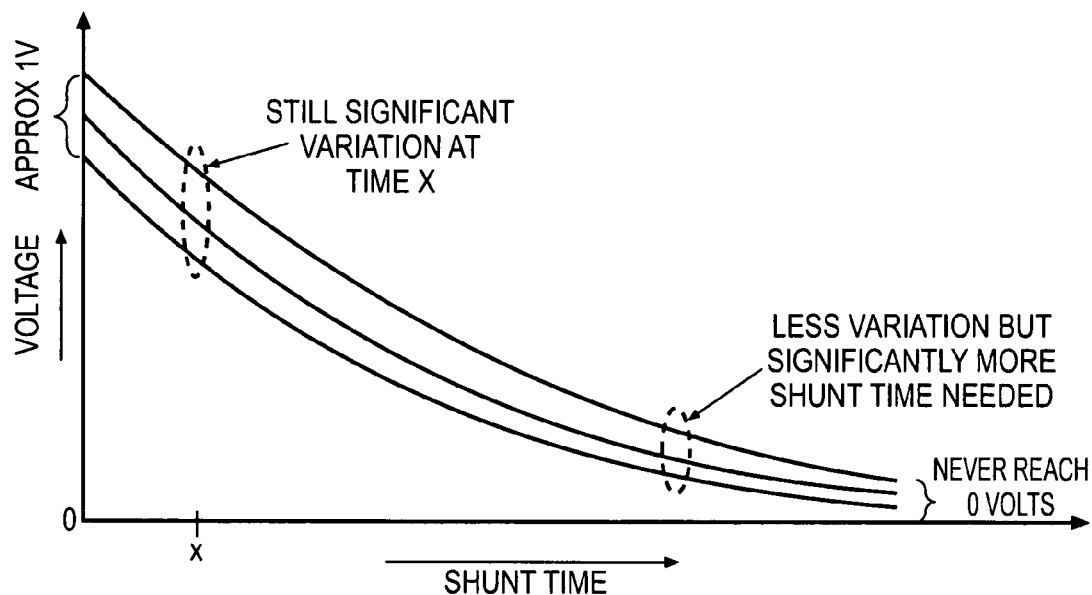
FIGS. 6A and 6B contrast the shunt operation performed in accordance with a prior art technique with the shunt operation performed in accordance with embodiments of the present invention.

FIG. 6A illustrates the exponential nature of the drop in voltage occurring when discharging the capacitor during the shunt operation of the earlier-discussed prior art technique of US 2007/0176670, where the capacitor is coupled to ground during a discharging operation to seek to discharge the voltage to zero. However, as is apparent from FIG. 6A, the voltage never actually reaches zero, and further in any practical system there is only a finite amount of time allowed for performing the shunt operation. Indeed, in US 2007/0176670, the period of the shunt operation is the same as the period of the charge operation, and of the subsequent powering operation when the processing device is driven from the capacitor. Accordingly, it will be appreciated that at the end of the shunt stage, there will be a variation in the final voltage reached, which will depend on the starting voltage at the time the shunt operation began.

Figure 6B:
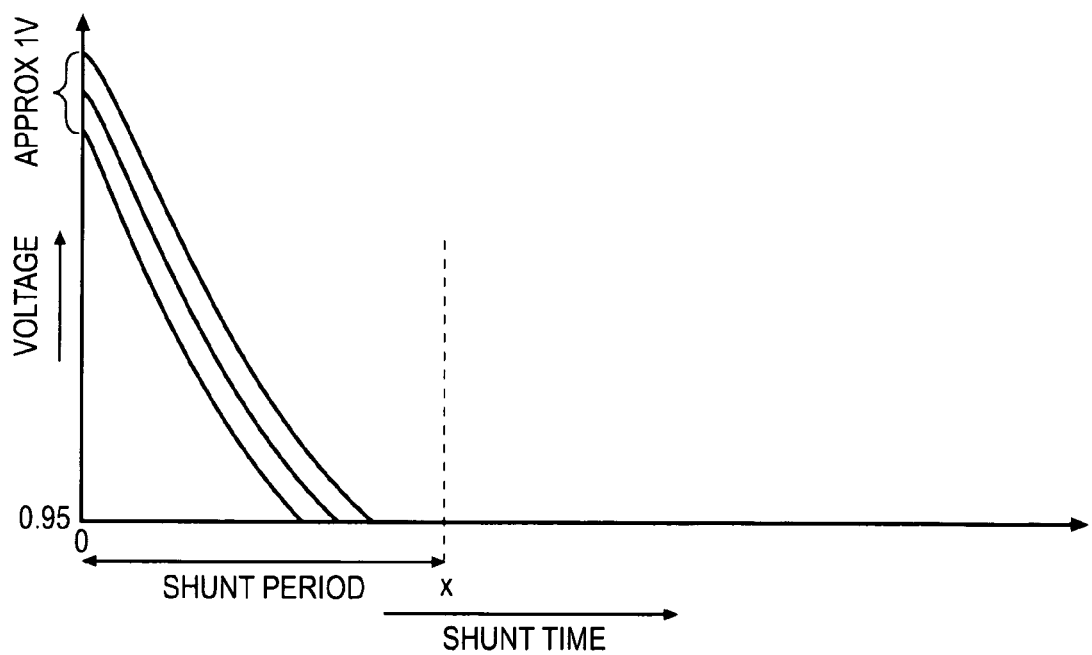

FIG. 6B illustrates the discharge operation that is performed by the shunt circuit in accordance with embodiments of the present invention. In particular, as discussed earlier, the voltage will be discharged to a predetermined reference voltage, in this example 0.95 Volts, and whilst the time taken to reach that voltage level may vary dependent on the starting voltage, that voltage will be reached in all cases prior to the end of the shunt period (indicated by time X in FIG. 6B).

In contrast, when time X is considered in the diagram of FIG. 6A, it will be seen that there is still a significant variation in the final voltage reached dependent on the initial voltage at the start of the shunt operation. Since this information then becomes available to an attacker using DPA techniques as soon as the charge phase is re-entered, this enables certain current signature information to be obtained that is data dependent. Accordingly, there is still a possibility when using the prior art technique of US 2007/0176670 of successfully using DPA techniques to obtain the secret key.

In contrast, as discussed earlier with reference to FIG. 5, when employing techniques in accordance with embodiments of the present invention, this is not possible, since the current signatures observed during the charging stage are always identical.

FIG. 7A is a table illustrating the charging sequence control signals issued by the control circuitry 160 for the various sub-circuits 100, 105, 110 illustrated in FIG. 2. In this example, the durations of the active state of the charge circuit, logic supply circuit and shunt circuit are all identical, and the control circuitry 160 manages the phased relationship so that at any point in time one sub-circuit has its charge circuit active, one sub-circuit has its logic supply circuit active, and one sub-circuit has its shunt circuit active.

FIG. 7B illustrates a switching sequence that may be generated by the control circuitry 160 in accordance with an alternative embodiment. Again, three switching cap modules are provided and again there is a phased relationship between the switching sequences provided for each of those modules. However, in this example, the durations of the active state of the charged circuit, logic supply circuit and shunt circuit are different, and as a result there are periods of time where the active state of the logic supply circuit in one sub-circuit overlaps with the active state of the logic supply circuit in another sub-circuit. One benefit of overlapping the phases between the different sub-circuits in such a manner is that there are periods of time where the processing circuitry is being powered by capacitors in two of the switching cap modules, thereby spreading any information about the power consumption of that processing circuitry over multiple capacitors. This further obfuscates any information about the power being consumed by the processing circuitry.

Whilst in FIG. 7B, it is only the active state of the logic supply circuit which is overlapped, it will be appreciated that in principal the active state of any of the circuits can be overlapped if desired.

Figure 8:
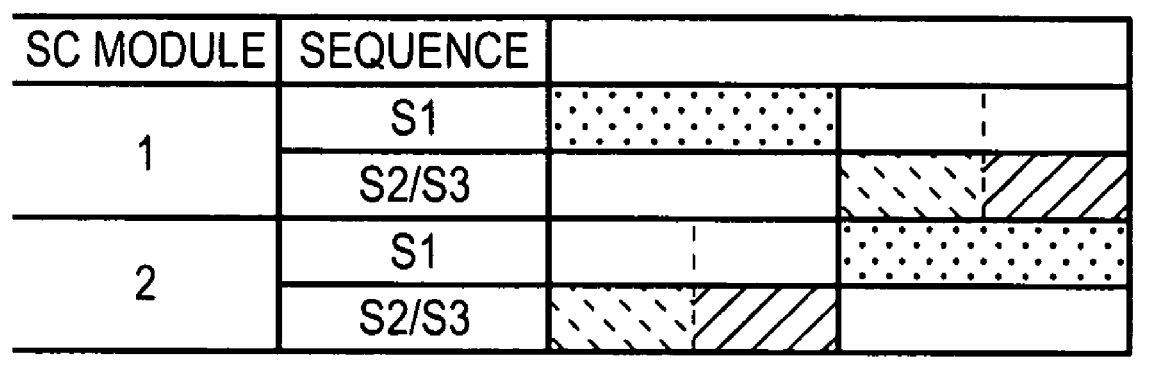

In the earlier described embodiments, it is assumed that there are at least three sub-circuits within the isolation circuitry. However, FIG. 8 illustrates a switching scheme which may be used by the control circuitry in situations where only two sub-circuits are provided. In particular, as can be seen from FIG. 8, the time period of the charging and shunting operations is chosen so that both operations can be accommodated during the period that the logic supply circuit is active. Hence, whilst the capacitor in one sub-circuit is being used to power the processing circuitry, the capacitor in the other sub-circuit is discharged by the shunt circuit and recharged by the charge circuit. Such an approach can enable a reduction in the size and cost of the isolation circuitry by reducing the number of components required to implement the isolation circuitry.

Figure 9:
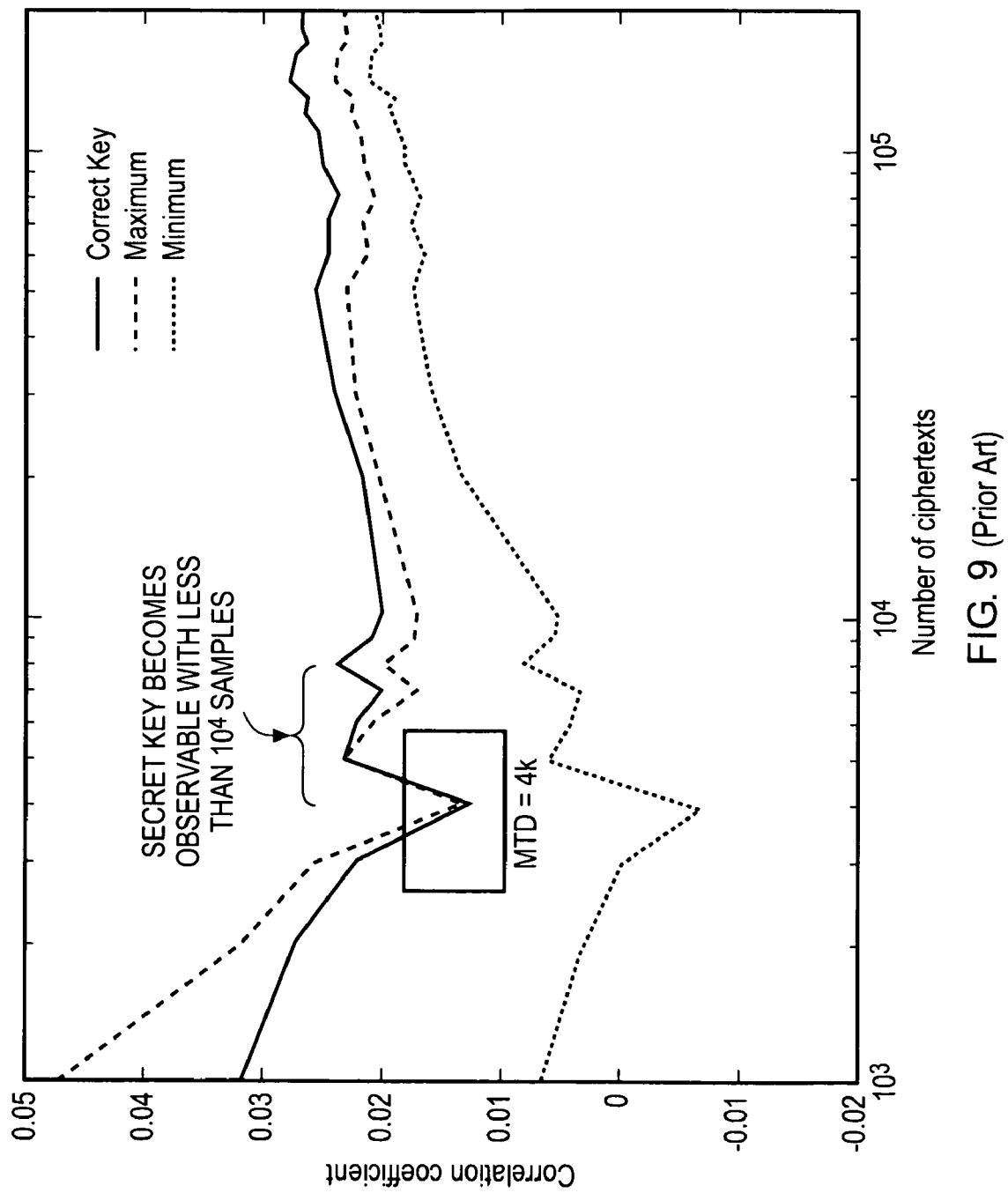
FIG. 9 illustrates the correlation coefficients that may be obtained when performing DPA analysis on a chip that does not incorporate a mechanism for hiding the power consumption characteristic of the processing circuitry within the chip.

FIG. 9 is a diagram schematically illustrating how the correlation coefficients obtained using a DPA technique vary with the number of input data samples for a chip where no isolation circuitry is provided. In this example, it is assumed that the circuitry is performing decryption using a secret key, and hence ciphertext are provided as input, and plaintext is produced as output. With a low number of input ciphertext, there is a significant amount of noise, and accordingly a wide distribution between the maximum and minimum correlation coefficients. However, as the number of input ciphertexts increases, the gap between the maximum and minimum correlation coefficients reduces. More importantly, it can be seen that by the time the number of inputs ciphertexts reaches 4000, the correct key starts to emerge as having the maximum correlation coefficient (this point being referred to as the "mean time to disclosure (MTD)), and becomes clearly observable with less then $10^4$ input ciphertexts.

Figure 10:
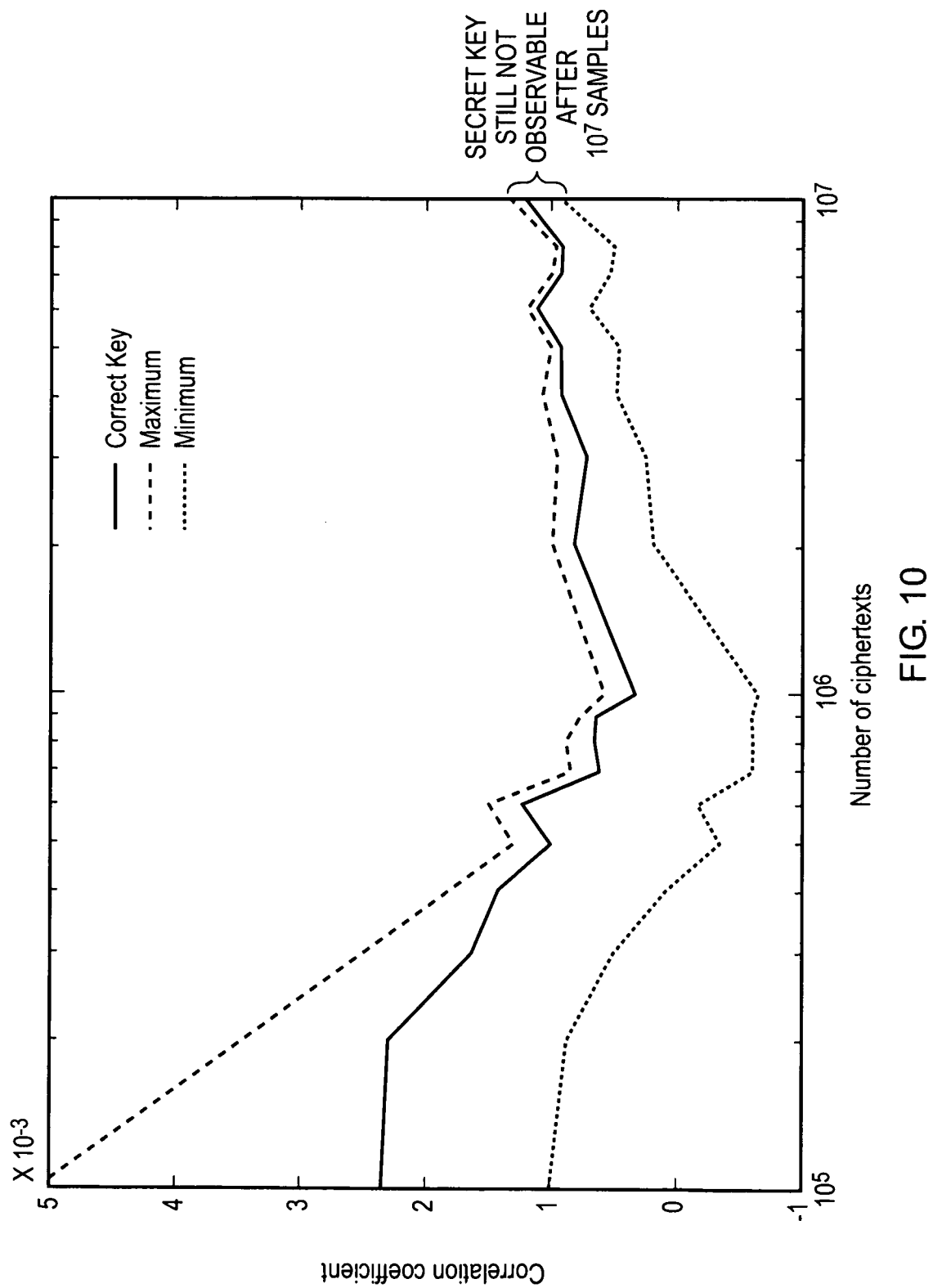
FIG. 10 illustrates the correlation coefficients that may be produced when performing DPA analysis on a chip including isolation circuitry in accordance with an embodiment of the present invention.

FIG. 10 illustrates the correlation coefficients that may be obtained using a DPA technique when the chip incorporates isolation circuitry in accordance with embodiments of the present invention. As can be seen, even after $10^7$ input ciphertexts have been used, the correct key has still not emerged as the guess key having the highest correlation coefficient, and instead cannot be detected. Hence, it will be appreciated that the techniques of embodiments of the present invention provide a particularly effective mechanism for preventing secret data being obtained via DPA techniques.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. Isolation circuitry for coupling between a power supply and processing circuitry in order to provide power to the processing circuitry whilst hiding a power consumption characteristic of that processing circuitry, the isolation circuitry comprising:
   a plurality of sub-circuits, each sub-circuit comprising:
      a capacitor;
      a first switch configured to provide a first connection between said capacitor and said power supply;
      a second switch configured to provide a second connection between said capacitor and an output to said processing circuitry;
      a third switch configured to provide a third connection across said capacitor to partially discharge said capacitor; and
   control circuitry configured to control said plurality of sub-circuits, such that within each sub-circuit said first switch, said second switch and said third switch are placed in an active state in a repeating sequence;
   each of said plurality of sub-circuits further comprising:
      a comparator configured to place said third switch in an open state when a predetermined non-zero voltage difference across said capacitor is reached during the active state of the third switch.

2. Isolation circuitry as claimed in claim 1, further comprising discharge tuning circuitry placed in series with said third switch across said capacitor, the discharge tuning circuitry being responsive to a control signal from the control circuitry to enable the rate of discharge of the capacitor during the active state of the third switch to be varied.

3. Isolation circuitry as claimed in claim 1, wherein the comparator comprises an op-amp receiving at a first input an indication of the voltage difference across said capacitor and at a second input an indication of said predetermined non-zero voltage.

4. Isolation circuitry as claimed in claim 1, further comprising a reference voltage generation element programmable to provide an indication of said predetermined non-zero voltage.

5. Isolation circuitry as claimed in claim 1, wherein for each sub-circuit the control circuitry controls the repeating sequence to ensure that only one of said first connection, said second connection and said third connection is provided at a time within that sub-circuit.

6. Isolation circuitry as claimed in claim 1, wherein said control circuit controls said plurality of sub-circuits such that the repeating sequences of the sub-circuits are in a phased relationship to one another.

7. Isolation circuitry as claimed in claim 6, wherein the phased relationship ensures that at most one first connection, one second connection and one third connection are provided by the isolation circuitry at any point in time.

8. Isolation circuitry as claimed in claim 6, wherein the phased relationship ensures that the active state of at least one of the first, second and third switches overlaps between the plurality of sub-circuits.

9. Isolation circuitry as claimed in claim 8, wherein the active state of at least the second switch overlaps between the plurality of sub-circuits, such that for at least some periods of time the processing circuitry receives its power from at least two of said plurality of sub-circuits.

10. Isolation circuitry as claimed in claim 1, wherein said plurality of sub-circuits comprises at least three sub-circuits.

11. Isolation circuitry as claimed in claim 6, wherein the active states of said first, second and third switches are not all of the same duration, and said plurality of sub-circuits comprise at least two sub-circuits.

12. An integrated circuit comprising:
   processing circuitry; and
   isolation circuitry as claimed in claim 1.

13. An integrated circuit as claimed in claim 12, wherein said processing circuitry performs encryption and decryption operations using at least one secret key.

14. An integrated circuit as claimed in claim 12, further comprising additional processing circuitry which is coupled directly to said power supply.

15. An integrated circuit as claimed in claim 12, wherein said integrated circuit is a smart card and said processing circuitry performs encryption and decryption operations using at least one secret key.

16. Isolation circuitry for coupling between power supply means and processing means for providing power to the processing means whilst hiding a power consumption characteristic of that processing means, the isolation circuitry comprising:
   a plurality of sub-circuit means, each sub-circuit means comprising:
      a capacitor means;
      a first switch means for providing a first connection between said capacitor means and said power supply means;
      a second switch means for providing a second connection between said capacitor means and an output to said processing means;
      a third switch means for providing a third connection across said capacitor means to partially discharge said capacitor means; and
   control means for controlling said plurality of sub-circuit means, such that within each sub-circuit means said first switch means, said second switch means and said third switch means are placed in an active state in a repeating sequence;

each of said plurality of sub-circuit means further comprising:

comparator means for placing said third switch means in an open state when a predetermined non-zero voltage difference across said capacitor means is reached during the active state of the third switch means.

17. A method of employing a plurality of sub-circuits to interconnect a power supply and processing circuitry in order to provide power to the processing circuitry whilst hiding a power consumption characteristic of that processing circuitry, the method comprising performing in each of the plurality of sub-circuits a repeating sequence comprising the steps of:

connecting the power supply to a capacitor to charge said capacitor;

disconnecting the power supply from the capacitor;

connecting said capacitor to an output to said processing circuitry;

disconnecting said capacitor from said output;

shorting said capacitor to partially discharge said capacitor; and stopping the shorting of said capacitor when a predetermined non-zero voltage difference across said capacitor is reached.

* * * * *